US011920496B1

(12) United States Patent
Kim et al.

(10) Patent No.: US 11,920,496 B1
(45) Date of Patent: Mar. 5, 2024

(54) AIRFOIL, AND TURBINE BLADE AND GAS TURBINE INCLUDING THE SAME

(71) Applicant: DOOSAN ENERBILITY CO., LTD., Changwon-si (KR)

(72) Inventors: Ki Baek Kim, Yongin (KR); Seok Beom Kim, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/465,182

(22) Filed: Sep. 12, 2023

(30) Foreign Application Priority Data

Nov. 10, 2022 (KR) ........................ 10-2022-0149804

(51) Int. Cl.
*F01D 5/18* (2006.01)

(52) U.S. Cl.
CPC ........ *F01D 5/186* (2013.01); *F05D 2250/185* (2013.01); *F05D 2260/202* (2013.01); *F05D 2260/2214* (2013.01)

(58) Field of Classification Search
CPC ............... F01D 5/186; F05D 2260/202; F05D 2250/185
See application file for complete search history.

(56) References Cited

U.S. PATENT DOCUMENTS

| | | | | |
|---|---|---|---|---|
| 7,458,778 B1 * | 12/2008 | Liang | F01D 5/187 416/97 R |
| 9,017,025 B2 | 4/2015 | Lee | |
| 10,196,903 B2 * | 2/2019 | Benson | F01D 5/143 |
| 10,294,799 B2 | 5/2019 | Spangler | |
| 10,519,782 B2 | 12/2019 | Clum | |
| 10,641,105 B2 * | 5/2020 | Clum | F01D 5/147 |
| 2017/0204730 A1 * | 7/2017 | Benson | F01D 5/187 |
| 2019/0048729 A1 * | 2/2019 | Clum | F01D 5/147 |

FOREIGN PATENT DOCUMENTS

| | | |
|---|---|---|
| CN | 111927562 A | 11/2020 |
| CN | 113550794 A | 10/2021 |
| JP | 6434145 B2 | 12/2018 |
| KR | 10-2007-0049552 A | 5/2007 |
| KR | 10-2005546 B1 | 7/2019 |
| KR | 10-2028803 B1 | 9/2019 |
| KR | 10-2153064 B2 | 9/2020 |
| KR | 10-2161765 B1 | 9/2020 |
| KR | 10-2022-0101510 A | 7/2022 |

* cited by examiner

*Primary Examiner* — Eldon T Brockman
(74) *Attorney, Agent, or Firm* — Harvest IP Law, LLP

(57) ABSTRACT

Disclosed herein are an airfoil, and a turbine blade and gas turbine including the same. The airfoil includes a first cooling passage allowing a first cooling fluid introduced from the bottom of a leading edge to flow into a first serpentine channel formed on a pressure side, and to be then discharged to the rear of a trailing edge, and a second cooling passage allowing a second cooling fluid introduced from the bottom of a suction side to be divided and flow into at least two second serpentine channels formed on the suction side, and allowing the divided cooling fluids introduced into the at least two second serpentine channels to be joined at the bottom thereof and to be then discharged to the rear of the trailing edge.

20 Claims, 11 Drawing Sheets

AIRFOIL, AND TURBINE BLADE AND GAS TURBINE INCLUDING THE SAME

CROSS-REFERENCE TO RELATED APPLICATION

This application claims priority to Korean Patent Application No. 10-2022-0149804, filed on Nov. 10, 2022, the disclosure of which is incorporated herein by reference in its entirety.

BACKGROUND

Technical Field

Exemplary embodiments relate to an airfoil, and a turbine blade and gas turbine including the same.

Related Art

Turbines are machines that obtain a rotational force by impingement or reaction force using the flow of compressible fluid such as steam or gas, and include a steam turbine using steam, a gas turbine using hot combustion gas, and so on.

Among them, the gas turbine largely includes a compressor, a combustor, and a turbine. The compressor has an air inlet for introduction of air thereinto, and includes a plurality of compressor vanes and compressor blades alternately arranged in a compressor casing.

The combustor supplies fuel to air compressed by the compressor and ignites a mixture thereof using a burner to produce high-temperature and high-pressure combustion gas.

The turbine includes a plurality of turbine vanes and turbine blades alternately arranged in a turbine casing. In addition, a rotor is disposed to pass through the centers of the compressor, the combustor, the turbine, and an exhaust chamber.

The rotor is rotatably supported at both ends thereof by bearings. The rotor has a plurality of disks fixed thereto, and blades are connected to each of the disks. A drive shaft of, e.g., a generator, is connected to the end of the exhaust chamber.

The gas turbine is advantageous in that consumption of lubricant is extremely low due to the absence of mutual friction parts such as a piston-cylinder system found in four-stroke engines. This absence of reciprocating mechanism such as a piston leads to a significant reduction in the amplitude, which is a characteristic of reciprocating machines. Additionally, it enables high-speed motion.

The operation of the gas turbine is briefly described. The air compressed by the compressor is mixed with fuel so that the mixture thereof is burned to produce hot combustion gas, and the produced combustion gas is injected into the turbine. The injected combustion gas generates a rotational force while passing through the turbine vanes and the turbine blades, thereby rotating the rotor.

SUMMARY

Aspects of one or more exemplary embodiments provide an airfoil with improved cooling efficiency, and a turbine blade and gas turbine including the same.

Further aspects will be set forth in the subsequent description and some will become apparent from the description itself, or may be acquired through practical application of the exemplary embodiments.

According to an aspect of an exemplary embodiment, there is provided an airfoil that includes a suction side forming a curved surface convexly protruding outward, a pressure side forming a curved surface concavely recessed toward the suction side, a leading edge connecting the suction side and the pressure side and formed at a front end of the airfoil, a trailing edge connecting the suction side and the pressure side and formed at a rear end of the airfoil, a first cooling passage allowing a first cooling fluid introduced from the bottom of the leading edge to flow into a first serpentine channel formed on the pressure side, and to be then discharged to the rear of the trailing edge, and a second cooling passage allowing a second cooling fluid introduced from the bottom of the suction side to be divided and flow into at least two second serpentine channels formed on the suction side, and allowing the divided cooling fluids introduced into the at least two second serpentine channels to be joined at the bottom thereof and to be then discharged to the rear of the trailing edge.

In the airfoil, the first cooling passage may include a first inlet extending downward from the bottom of the leading edge and through which the first cooling fluid flows, a 1_1 flow channel allowing the first cooling fluid introduced into the first inlet to flow toward an airfoil tip, a 1_2 flow channel formed adjacent to the 1_1 flow channel and allowing the first cooling fluid to flow toward a root, and a 1_3 flow channel formed adjacent to the 1_2 flow channel and allowing the first cooling fluid to flow toward the airfoil tip.

In the airfoil, the first cooling passage may include a 1_1 forward channel extending toward the trailing edge from an upper end of the 1_1 flow channel to 1_2 flow channel, and a 1_2 forward channel extending toward the trailing edge from a lower end of the 1_2 flow channel to the 1_3 flow channel.

In the airfoil, the first cooling passage may further include a 1_3 forward channel extending toward the trailing edge from an upper end of the 1_3 flow channel, and a first discharge channel through which the first cooling fluid flowing through the 1_3 flow channel is discharged to the outside.

In the airfoil, when the height from the base of the first cooling passage to the top of the first cooling passage is set to 100, the first discharge channel may be formed in a height range of 70 to less than 100.

In the airfoil, the second cooling fluid may be divided before being introduced into the second cooling passage.

In the airfoil, the second cooling passage may include a 2_1 inlet and a 2_2 inlet extending downward from the suction side and into which the divided second cooling fluid flows, a 2_1 flow channel and a 2_3 flow channel allowing the second cooling fluid introduced into the 2_1 inlet and the 2_2 inlet to flow toward an airfoil tip, respectively, and a 2_2 flow channel and a 2_4 flow channel formed adjacent to the 2_1 flow channel and the 2_3 flow channel and allowing the second cooling fluid to flow toward a root.

In the airfoil, the second cooling passage may further include a 2_1 forward channel extending toward the trailing edge from an upper end of the 2_1 flow channel to the 2_2 flow channel, and a 2_2 forward channel extending toward the leading edge from an upper end of the 2_3 flow channel to the 2_4 flow channel.

In the airfoil, the 2_2 flow channel and the 2_4 flow channel may have communication ports formed on respective lower ends thereof, the communication ports communicating with a central cavity formed among and surrounded by a leading edge cavity, a pressure side cavity, and a suction side cavity. The second cooling fluids flowing through the 2_2 flow channel and the 2_4 flow channel may be joined in the central cavity through the communication ports.

In the airfoil, the second cooling passage may include a second discharge channel through which the second cooling fluid in the central cavity is discharged to the outside, and a connection port may be formed on the trailing edge in the central cavity to communicate with the second discharge channel.

In the airfoil, the 2_1 inlet and the 2_2 inlet may be close to each other, and the second cooling passage may further include a 2_1 forward channel extending toward the leading edge from an upper end of the 2_1 flow channel to the 2_2 flow channel, and a 2_2 forward channel extending toward the trailing edge from an upper end of the 2_3 flow channel to the 2_4 flow channel.

According to an aspect of another exemplary embodiment, there is provided a turbine blade mounted on a turbine rotor disk and rotated by high-pressure combustion gas. The turbine blade includes a root formed a lower side thereof and coupled to the turbine rotor disk, and an airfoil integrally formed on the root, the airfoil being rotated by the high-pressure combustion gas. The airfoil includes a suction side forming a curved surface convexly protruding outward, a pressure side forming a curved surface concavely recessed toward the suction side, a leading edge connecting the suction side and the pressure side and formed at a front end of the airfoil, a trailing edge connecting the suction side and the pressure side and formed at a rear end of the airfoil, a first cooling passage allowing a first cooling fluid introduced from the bottom of the leading edge to flow into a first serpentine channel formed on the pressure side, and to be then discharged to the rear of the trailing edge, and a second cooling passage allowing a second cooling fluid introduced from the bottom of the suction side to be divided and flow into at least two second serpentine channels formed on the suction side, and allowing the divided cooling fluids introduced into the at least two second serpentine channels to be joined at the bottom thereof and to be then discharged to the rear of the trailing edge.

In the turbine blade, the first cooling passage may include a first inlet extending downward from the bottom of the leading edge and through which the first cooling fluid flows, a 1_1 flow channel allowing the first cooling fluid introduced into the first inlet to flow toward an airfoil tip, a 1_2 flow channel formed adjacent to the 1_1 flow channel and allowing the first cooling fluid to flow toward the root, and a 1_3 flow channel formed adjacent to the 1_2 flow channel and allowing the first cooling fluid to flow toward the airfoil tip.

In the turbine blade, the first cooling passage may include a 1_1 forward channel extending toward the trailing edge from an upper end of the 1_1 flow channel to 1_2 flow channel, and a 1_2 forward channel extending toward the trailing edge from a lower end of the 1_2 flow channel to 1_3 flow channel.

In the turbine blade, the first cooling passage may further include a 1_3 forward channel extending toward the trailing edge from an upper end of the 1_3 flow channel, and a first discharge channel through which the first cooling fluid flowing through the 1_3 flow channel is discharged to the outside.

In the turbine blade, when the height from the base of the first cooling passage to the top of the first cooling passage is set to 100, the first discharge channel may be formed in a height range of 70 to less than 100.

In the turbine blade, the second cooling fluid is divided before being introduced into the second cooling passage.

In the turbine blade, the second cooling passage may include a 2_1 inlet and a 2_2 inlet extending downward from the suction side and into which the divided second cooling fluid flows, a 2_1 flow channel and a 2_3 flow channel allowing the second cooling fluid introduced into the 2_1 inlet and the 2_2 inlet to flow toward an airfoil tip, respectively, and a 2_2 flow channel and a 2_4 flow channel formed adjacent to the 2_1 flow channel and the 2_3 flow channel and allowing the second cooling fluid to flow toward the root.

In the turbine blade, the second cooling passage may further include a 2_1 forward channel extending toward the trailing edge from an upper end of the 2_1 flow channel to the 2_2 flow channel, and a 2_2 forward channel extending toward the leading edge from an upper end of the 2_3 flow channel to the 2_4 flow channel.

In the turbine blade, the 2_2 flow channel and the 2_4 flow channel may have communication ports formed on respective lower ends thereof, the communication ports communicating with a central cavity formed among and surrounded by a leading edge cavity, a pressure side cavity, and a suction side cavity. The second cooling fluids flowing through the 2_2 flow channel and the 2_4 flow channel may be joined in the central cavity through the communication ports.

In the turbine blade, the second cooling passage may include a second discharge channel through which the second cooling fluid in the central cavity is discharged to the outside, and a connection port may be formed on the trailing edge in the central cavity to communicate with the second discharge channel.

In the turbine blade, the 2_1 inlet and the 2_2 inlet may be close to each other, and the second cooling passage may further include a 2_1 forward channel extending toward the leading edge from an upper end of the 2_1 flow channel to the 2_2 flow channel, and a 2_2 forward channel extending toward the trailing edge from an upper end of the 2_3 flow channel to the 2_4 flow channel.

According to an aspect of a further exemplary embodiment, there is provided a gas turbine that includes a compressor configured to compress air introduced thereinto, a combustor configured to mix the air compressed by the compressor with fuel for combustion, and a turbine configured to generate power with combustion gas from the combustor and including a turbine vane for guiding the combustion gas on a combustion gas path through the combustion gas passes, and a turbine blade rotated by the combustion gas on the combustion gas path. The turbine blade is mounted on a turbine rotor disk and rotated by high-pressure combustion gas. The turbine blade includes a root formed a lower side thereof and coupled to the turbine rotor disk, and an airfoil integrally formed on the root, the airfoil being rotated by air pressure and having a cooling passage formed therein. The airfoil includes a suction side forming a curved surface convexly protruding outward, a pressure side forming a curved surface concavely recessed toward the suction side, a leading edge connecting the suction side and the pressure side and formed at a front end of the airfoil, a trailing edge connecting the suction side and the pressure side and formed at a rear end of the airfoil, a first cooling passage allowing a first cooling fluid introduced from the bottom of the leading edge to flow into a first serpentine channel formed on the pressure side, and to be then discharged to the rear of the trailing edge, and a second cooling passage allowing a second cooling fluid introduced from the bottom of the suction side to be divided and flow into at least two second serpentine channels formed on the suction side, and allowing the divided cooling fluids introduced into the at least two second serpentine channels to be joined at the bottom thereof and to be then discharged to the rear of the trailing edge.

In the gas turbine, the first cooling passage may include a first inlet extending downward from the bottom of the leading edge and through which the first cooling fluid flows, a 1_1 flow channel allowing the first cooling fluid introduced into the first inlet to flow toward an airfoil tip, a 1_2 flow channel formed adjacent to the 1_1 flow channel and allowing the first cooling fluid to flow toward the root, and a 1_3 flow channel formed adjacent to the 1_2 flow channel and allowing the first cooling fluid to flow toward the airfoil tip.

In the gas turbine, the first cooling passage may include a 1_1 forward channel extending toward the trailing edge from an upper end of the 1_1 flow channel to the 1_2 flow channel, and a 1_2 forward channel extending toward the trailing edge from a lower end of the 1_2 flow channel to the 1_3 flow channel.

In the gas turbine, the first cooling passage may further include a 1_3 forward channel extending toward the trailing edge from an upper end of the 1_3 flow channel, and a first discharge channel through which the first cooling fluid flowing through the 1_3 flow channel is discharged to the outside.

In the gas turbine, when the height from the base of the first cooling passage to the top of the first cooling passage is set to 100, the first discharge channel may be formed in a height range of 70 to less than 100.

In the gas turbine, the second cooling fluid is divided before being introduced into the second cooling passage.

In the gas turbine, the second cooling passage may include a 2_1 inlet and a 2_2 inlet extending downward from the suction side and into which the divided second cooling fluid flows, a 2_1 flow channel and a 2_3 flow channel allowing the second cooling fluid introduced into the 2_1 inlet and the 2_2 inlet to flow toward an airfoil tip, respectively, and a 2_2 flow channel and a 2_4 flow channel formed adjacent to the 2_1 flow channel and the 2_3 flow channel and allowing the second cooling fluid to flow toward the root.

In the gas turbine, the second cooling passage may further include a 2_1 forward channel extending toward the trailing edge from an upper end of the 2_1 flow channel to the 2_2 flow channel, and a 2_2 forward channel extending toward the leading edge from an upper end of the 2_3 flow channel to the 2_4 flow channel.

In the gas turbine, the 2_2 flow channel and the 2_4 flow channel may have communication ports formed on respective lower ends thereof, the communication ports communicating with a central cavity formed among and surrounded by a leading edge cavity, a pressure side cavity, and a suction side cavity. The second cooling fluids flowing through the 2_2 flow channel and the 2_4 flow channel may be joined in the central cavity through the communication ports.

In the gas turbine, the second cooling passage may include a second discharge channel through which the second cooling fluid in the central cavity is discharged to the outside, and a connection port may be formed on the trailing edge in the central cavity to communicate with the second discharge channel.

In the gas turbine, the 2_1 inlet and the 2_2 inlet may be close to each other, and the second cooling passage may further include a 2_1 forward channel extending toward the leading edge from an upper end of the 2_1 flow channel to the 2_2 flow channel, and a 2_2 forward channel extending toward the trailing edge from an upper end of the 2_3 flow channel to the 2_4 flow channel.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
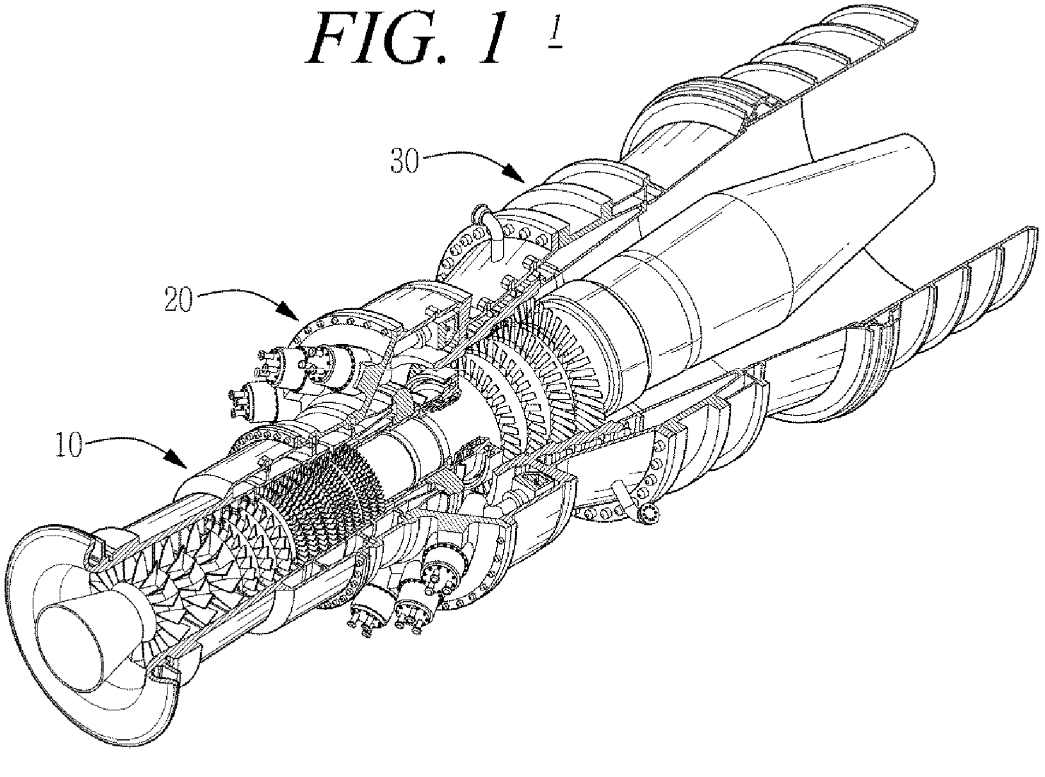
FIG. 1 is a cut-away view illustrating a gas turbine according to an exemplary embodiment.

Hereinafter, a turbine blade and a gas turbine including the same according to exemplary embodiments will be described in detail with reference to the accompanying drawings. The present disclosure may, however, be embodied in different forms, and should not be construed as being limited to the embodiments set forth herein. Rather, these embodiments are provided so that this disclosure will be thorough and complete, and will fully convey the scope of the present disclosure to those skilled in the art.

Throughout the specification, it will be understood that, when a component is referred to as “comprising” or “including” any component, it does not exclude other components, but can further comprise or include the other components unless otherwise specified. In addition, it should be understood that the term “on” as used herein means that one element is located above or below another element, and does not necessarily mean that one element is located above another element on the basis of the direction of gravity.

Exemplary embodiments will be described below in detail with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Figure 2:
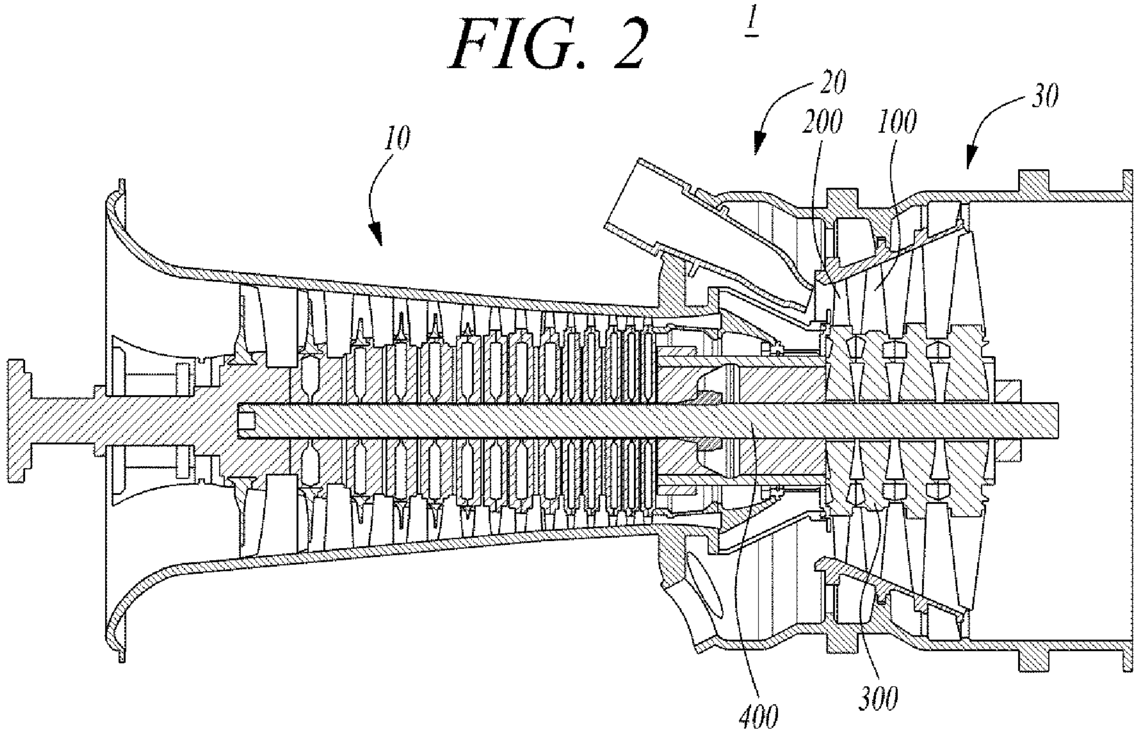
FIG. 2 is a partial cross-sectional view illustrating the gas turbine of FIG. 1.

FIG. 1 is a cut-away view illustrating a gas turbine according to an exemplary embodiment. FIG. 2 is a partial cross-sectional view illustrating the gas turbine of FIG. 1.

As illustrated in FIGS. 1 and 2, the gas turbine, which is designated by reference numeral 1, according to the exemplary embodiment includes a compressor 10, a combustor 20, and a turbine 30. The compressor 10 serves to compress air introduced thereinto to a high pressure and delivers the compressed air to the combustor. The compressor 10 has a plurality of radially installed compressor blades, and receives a portion of the power generated by the rotation of the turbine 30 to rotate the compressor blades. The compressor 10 compresses air by the rotation of the blades so that the compressed air flows to the combustor 20. The size and installation angle of each blade may vary depending on the installation position of the blade.

The air compressed in the compressor 10 flows to the combustor 20 and is then mixed with fuel while passing through a plurality of combustion chambers and fuel nozzle modules arranged annularly for combustion. The combustion gas having a high-temperature and a high-pressure is produced by the combustion and is discharged to the turbine 30. The turbine is rotated by the combustion gas.

The turbine 30 includes a plurality of turbine rotor disks 300 coupled axially by a center tie rod 400 and arranged in a multistage manner. Each of the turbine rotor disks 300 includes a plurality of turbine blades 100 arranged radially thereon. The turbine blades 100 may be coupled to the turbine rotor disk 300 in a dovetail manner or the like. In addition, a plurality of turbine vanes 200 fixed in a turbine casing are provided between the individual turbine blades 100 to guide the direction of flow of the combustion gas that has passed through the turbine blades.

As illustrated in FIG. 2, for example, the turbine 30 may be configured such that the N number of turbine vanes 200 and turbine blades 100 are alternately arranged in the axial direction of the gas turbine 1 (N being a natural number). The hot combustion gas axially passes through the turbine vanes 200 and the turbine blades 100 and allows the turbine blades 100 to rotate.

An airfoil according to exemplary embodiments of this disclosure may be applied to each turbine blade 100. In addition, the technical ideas described herein are not limited to the gas turbine, and may be applied to a device having an airfoil, including a steam turbine.

Figure 3:
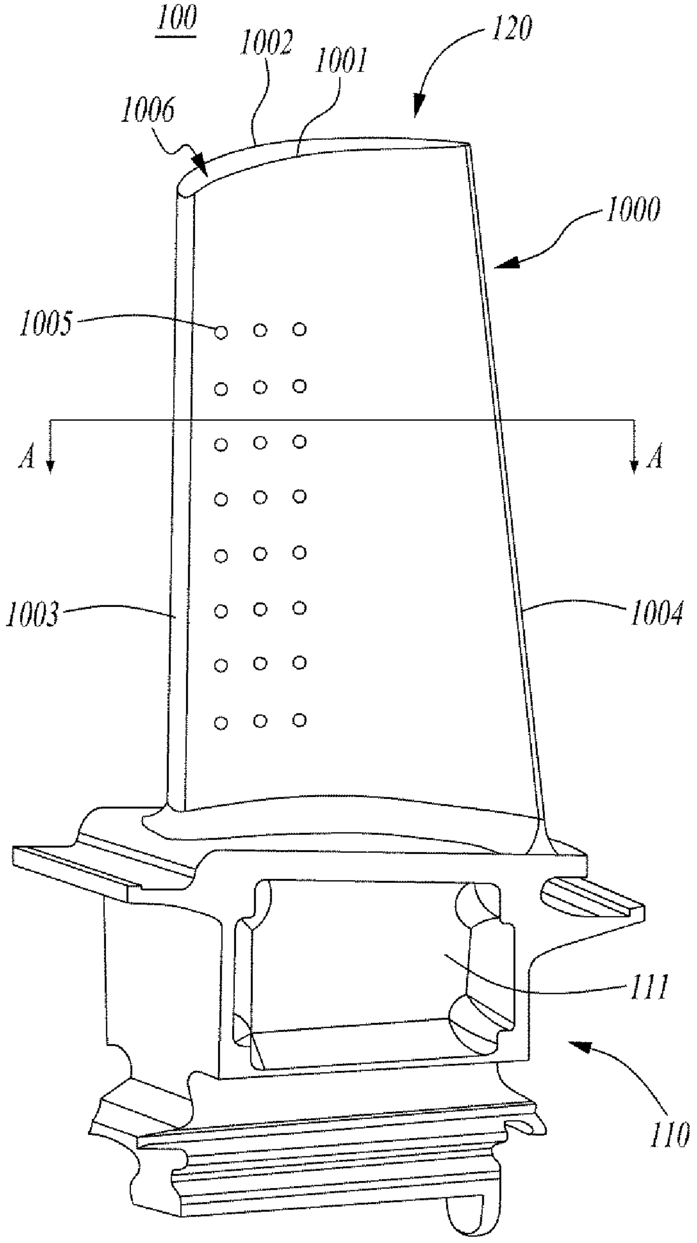
FIG. 3 is a perspective view illustrating a turbine blade including an airfoil according to the exemplary embodiment.

FIG. 3 is a perspective view illustrating the turbine blade including the airfoil according to an exemplary embodiment.

Referring to FIG. 3, the turbine blade 100 according to the exemplary embodiment includes a root 110 and an airfoil 1000.

The turbine blade 100 is mounted on the turbine rotor disk 300 so that the turbine is rotated and operated by high-pressure combustion gas. The root 110 is formed on the lower side of the turbine blade 100 and coupled to the turbine rotor disk 300. The lower side, a lower direction and an upper side and an upper direction are defined based on the radial direction from the rotor disk 300 when the turbine blade 100 is assembled with the rotor disk 300. The airfoil 1000 rotated by the pressure of gas may be integrally formed on the root 110. Thus, the turbine 30 is rotated and operated by the pressure difference between the front and rear surfaces of the airfoil 1000.

A shank and a platform are formed to protrude outward (i.e., in the axial direction along the turbine 30) on the outer surface of the root 110 and below the airfoil 1000 so as to ensure secure fixation. The root 110 has a root inlet 111 for introduction of a cooling fluid into the airfoil 1000. The cooling fluid may be a part of the air compressed by the compressor 10 or air produced by compressing outside air. The cooling fluid is supplied from the compressor 10 to the root 110 of the turbine blade 100, and cools the turbine blade 100 while flowing into the airfoil 1000 through the root inlet 111. Alternatively, the cooling fluid may be supplied to the root 110 through an internal passage (not shown) connected from the compressor 10 to the turbine 30, and cools the turbine blade 100 while flowing into the airfoil 1000 through the root inlet 111.

The airfoil 1000 has a suction side 1002 formed on the rear surface thereof forming a curved surface convexly protruding outward, and a pressure side 1001 formed on the front surface thereof and forming a curved surface concavely recessed toward the suction side 1002. This maximizes the pressure difference between the front and rear surfaces of the airfoil 1000 and ensures a smooth flow of gas.

The airfoil 1000 includes a leading edge 1003 and a trailing edge 1004, which are both ends where the pressure side 1001 and the suction side 1002 meet each other. The leading edge 1003 refers to a front end facing the fluid flowing in the airfoil 1000, and the trailing edge 1004 refers to a rear end of the airfoil 1000. In addition, the span direction refers to as a direction toward an airfoil tip 1006 from the root. In other words, the span direction is the radial direction from the rotor disk 300 when the turbine blade 100 is assembled with the rotor disk 300.

The airfoil 1000 may include a plurality of cooling holes 1005 formed through the suction side 1002 and/or the pressure side 1001. The cooling fluid may cool the outer surface of the airfoil 1000 by so-called film cooling while acting like an air curtain on the outer surface of the airfoil by spraying from the inside of the airfoil through the cooling holes 1005. According to an embodiment, no cooling hole may be formed on the leading edge 1003.

Figure 4:
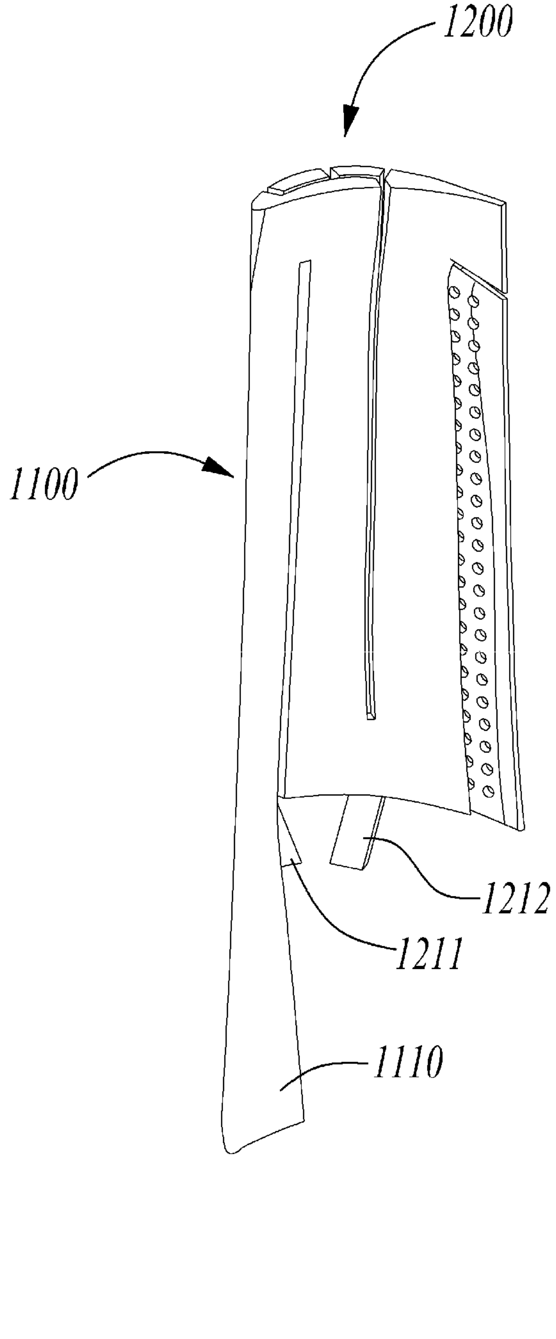
FIG. 4 is a perspective view illustrating an interior of the airfoil when viewed from the pressure side thereof according to the exemplary embodiment.
Figure 5:
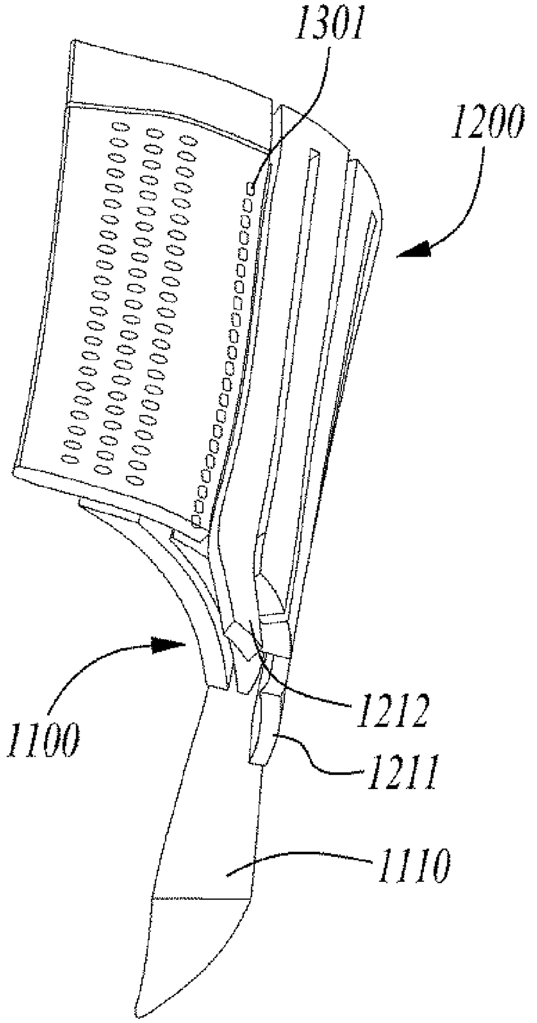
FIG. 5 is a perspective view illustrating an interior of the airfoil when viewed from the suction side thereof according to the exemplary embodiment.

FIG. 4 is a perspective view illustrating an interior of the airfoil when viewed from the pressure side thereof according to the exemplary embodiment. FIG. 5 is a perspective view illustrating an interior of the airfoil when viewed from the suction side thereof according to the exemplary embodiment.

Referring to FIGS. 4 and 5, the airfoil 1000 includes therein a first cooling passage 1100 and a second cooling passage 1200 through which a cooling fluid flows. The cooling fluid impinges on the inner walls of the first and second cooling passages 1100 and 1200 while flowing through the first and second cooling passages 1100 and 1200, thereby cooling the airfoil 1000 by absorbing heat therefrom.

The first cooling passage 1100 allows the cooling fluid introduced from the bottom of the leading edge 1003 to flow into serpentine channels 1120 to 1180 formed on the pressure side 1001, and to be then discharged to the rear of the trailing edge 1004.

The second cooling passage 1200 allows the cooling fluid introduced from the bottom of the suction side 1002 to be divided and flow into a plurality of serpentine channels 1221 to 1251 and 1222 to 1252 formed on the suction side 1002, and allows the divided cooling fluids introduced into the serpentine channels to be joined at the bottom thereof and to be then discharged to the rear of the trailing edge 1004.

In the following description, the serpentine channels 1120 to 1180 on pressure side 1001, which form the first cooling passage 1100, are referred to as a first serpentine channel, and the cooling fluid introduced into the first serpentine channel is referred to as a first cooling fluid. Similarly, the serpentine channels 1221 to 1251 and 1222 to 1252 on the suction side 1002, which form the second cooling passage 1200, are referred to as a second serpentine channel, and the cooling fluid introduced into the second serpentine channel is referred to as a second cooling fluid. Each of the serpentine channels may refer to a flow channel having a serpentine shape so that a fluid flows from bottom to top, moves to an adjacent passage, and then flows again from top to bottom or so that a fluid flows from top to bottom, moves to an adjacent passage, and then flows again from bottom to top.

Figure 6:
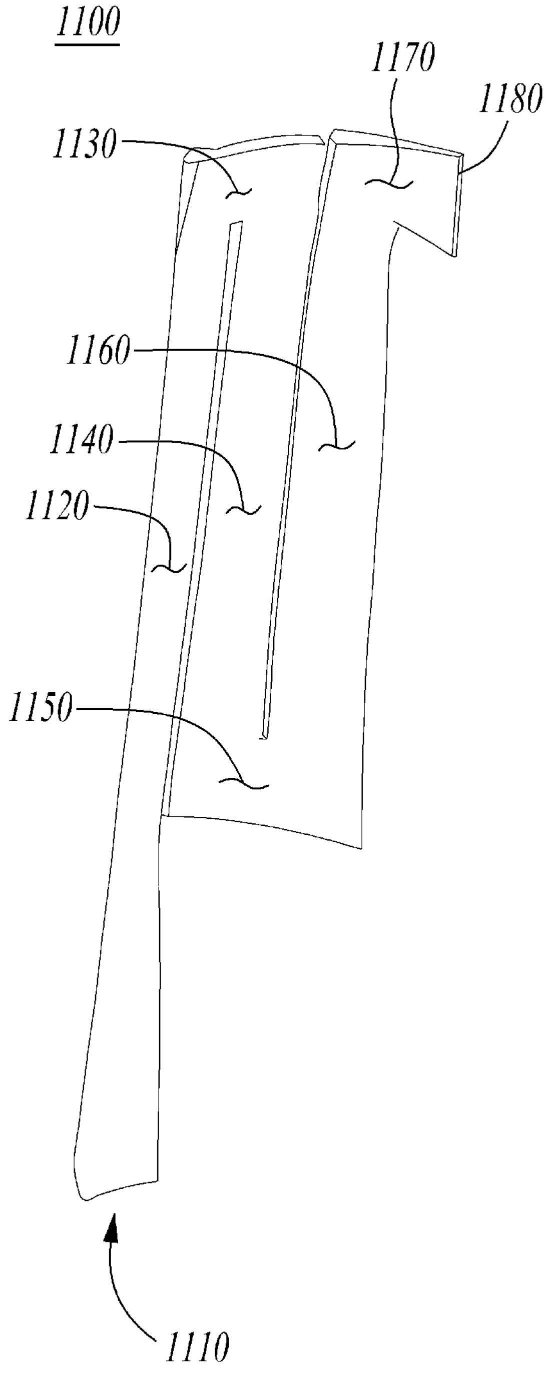
FIGS. 6 and 7 are perspective views illustrating a first cooling passage formed within the airfoil according to the exemplary embodiment.
Figure 7:
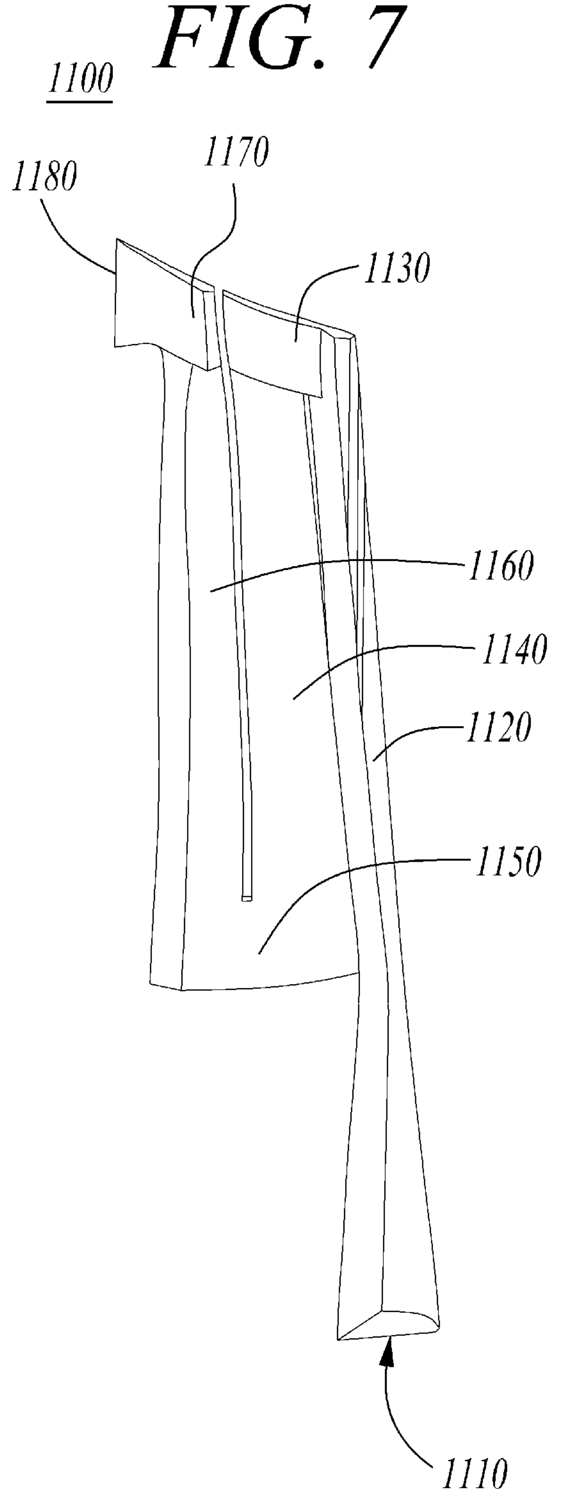

FIGS. 6 and 7 are perspective views illustrating the first cooling passage 1100 formed within the airfoil according to the exemplary embodiment. FIG. 6 illustrates the first cooling passage when viewed from the pressure side 1001. FIG. 7 illustrates the first cooling passage when viewed from the suction side 1002.

Referring to FIGS. 6 and 7, the first cooling passage 1100 may include a first inlet 1110, a 1_1 flow channel 1120, a 1_1 forward channel 1130, a 1_2 flow channel 1140, a 1_2 forward channel 1150, a 1_3 flow channel 1160, a 1_3 forward channel 1170, and a first discharge channel 1180. Of course, the number of flow channels and forward channels is exemplary, and the present disclosure is not limited thereto.

The first inlet 1110 extends downward from the bottom of the leading edge 1003 by a predetermined length. Specifically, the first inlet 1110 is fluidly connected to a cavity on the leading edge 1003 and extends downward. The cavity on the leading edge 1003 may be substantially the same with the 1_1 flow channel 1120 (see FIG. 10). At least a portion of the cooling fluid introduced into the root inlet 111 formed in the root 110 may flow into the first inlet 1110. The cooling fluid introduced into the first inlet 1110 is a first cooling fluid.

The 1_1 flow channel 1120 communicates with the first inlet 1110, and the first cooling fluid introduced into the first inlet 1110 flows upward toward the airfoil tip 1006. The 1_1 flow channel 1120 may be substantially the same with the cavity on the leading edge 1003.

The 1_1 forward channel 1130 is formed at the upper end of the 1_1 flow channel 1120 by extending toward the trailing edge 1004. The 1_1 forward channel 1130 allows the first cooling fluid flowing through the 1_1 flow channel 1120 to flow to the 1_2 flow channel 1140. The 1_2 flow channel 1140 allows the first cooling fluid to flow downward toward the root 110.

The 1_2 forward channel 1150 is formed at the lower end of the 1_2 flow channel 1140 by extending toward the trailing edge 1004. The 1_2 forward channel 1150 allows the first cooling fluid flowing through the 1_2 flow channel 1140 to flow to the 1_3 flow channels 1160. The 1_3 flow channel 1160 allows the first cooling fluid to flow upward toward the airfoil tip 1006.

The 1_3 forward channel 1170 is formed at the upper end of the 1_3 flow channel 1160 by extending toward the trailing edge 1004. The 1_3 forward channel 1170 allows the first cooling fluid flowing through the 1_3 flow channel 1160 to flow to the first discharge channel 1180. The first cooling fluid is discharged out of the airfoil 1000 through the first discharge channel 1180. The first discharge channel 1180 may have a plurality of discharge holes (not shown) formed to discharge the first cooling fluid.

Meanwhile, when establishing the height measurement from the base of the first cooling passage 1100 (which is substantially the same as the base of the 1_2 forward channel 1150 and is designated as 0) to the uppermost point of the first cooling passage 1100 as 100 units, it is preferable to configure the first discharge channel 1180 in a height range of 70 to less than 100. In other words, it is preferable to configure such that both the lower end and the upper end of the first discharge channel 1180 are within the range between the 70 units and the 100 units. It is usually preferable that the ratio of the cooling fluid discharged through the first discharge channel 1180 and a second discharge channel 1260 to be described later be approximately 4:6. Alternatively, when the size of the first discharge channel 1180 is set to 1, it is usually preferable to configure the size ratio of the first discharge channel 1180 and the second discharge channel 1260 to be 1:(7/3 to 5). Accordingly, when the first discharge channel 1180 is formed within a height range of 70 to less than 100, it becomes simpler to achieve the ratio as described above.

The 1_1 flow channel 1120 is formed on the leading edge 1003, and the channels 1130 to 1180 directly or indirectly connected to the 1_1 flow channel 1120 are formed on the pressure side 1001. The above channels 1120 to 1180 forms the first serpentine channel. This continuous channel design elongates and increases the flow path and the flow time of the first cooling fluid, thereby improving cooling efficiency. In particular, the first cooling fluid flowing through the first cooling passage 1100 can effectively cool the leading edge 1003, the pressure side 1001, and the airfoil tip on the pressure side 1001.

Figure 8:
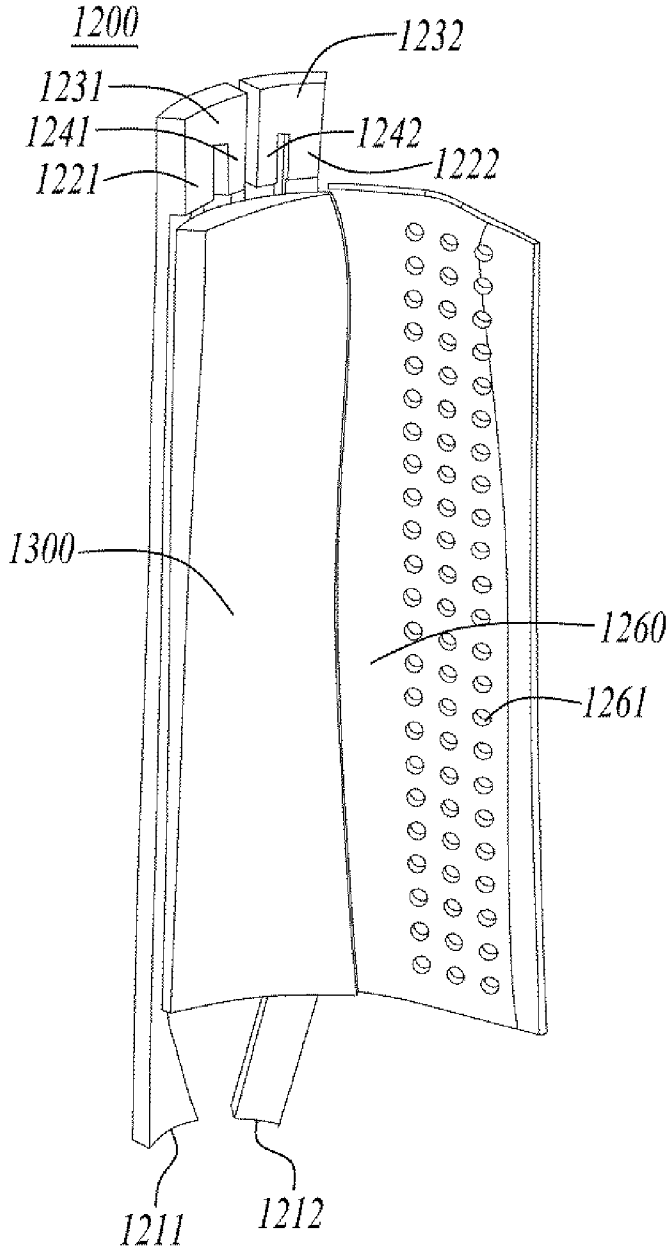
FIGS. 8 and 9 are perspective views illustrating a second cooling passage formed within the airfoil according to the exemplary embodiment.
Figure 9:
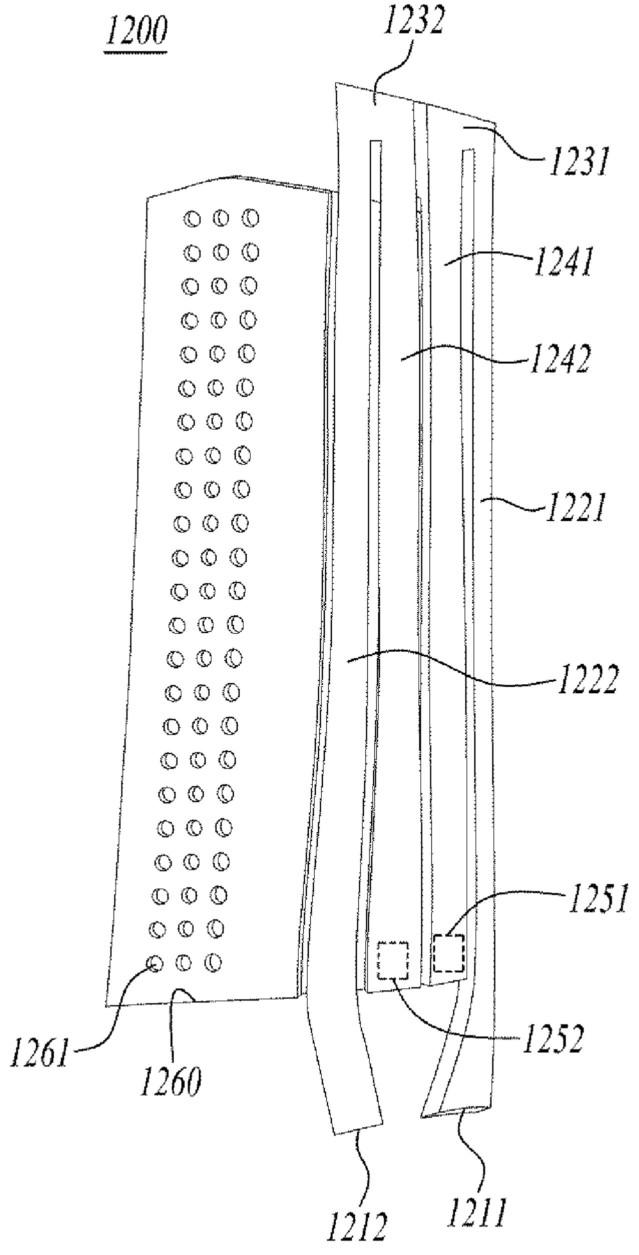

FIGS. 8 and 9 are perspective views illustrating the second cooling passage 1200 formed within the airfoil according to the exemplary embodiment. FIG. 8 illustrates the second cooling passage when viewed from the pressure side 1001. FIG. 9 illustrates the second cooling passage when viewed from the suction side 1002.

Referring to FIGS. 8 and 9, the second cooling passage 1200 may include a 2_1 inlet 1211, a 2_1 flow channel 1221, a 2_1 forward channel 1231, a 2_2 flow channel 1241, a 2_2 inlet 1212, a 2_3 flow channel 1222, a 2_2 forward channel 1232, a 2_4 flow channel 1242, and a second discharge channel 1260. The 2_1 inlet 1211 and the 2_2 inlet 1212 may be collectively referred to as second inlets 1211 and 1212.

The 2_1 inlet 1211, the 2_1 flow channel 1221, the 2_1 forward channel 1231, and the 2_2 flow channel 1241 may form a 2_1 serpentine channel, and the 2_2 inlet 1212, the 2_3 flow channel 1222, the 2_2 forward channel 1232, and the 2_4 flow channel 1242 may form a 2_2 serpentine channel. Of course, the number of flow channels, forward channels, and serpentine channels is exemplary, and the present disclosure is not limited thereto.

The 2_1 inlet 1211 and the 2_2 inlet 1212 extend downward from the bottom of the suction side 1002 by a predetermined length. The 2_1 inlet 1211 may be formed on the leading edge 1003, and the 2_2 inlet 1212 may be formed on or near to the trailing edge 1004.

At least a portion of the cooling fluid introduced into the root inlet 111 formed in the root 110 may flow into the 2_1 inlet 1211, and another portion of the cooling fluid introduced into the root inlet 111 may also flow into the 2_2 inlet 1212. The cooling fluid introduced into each of the second inlets 1211 and 1212 is the second cooling fluid.

The 2_1 flow channel 1221 communicates with the 2_1 inlet 1211, and the second cooling fluid introduced into the 2_1 inlet 1211 flows upward toward the airfoil tip 1006.

The 2_1 forward channel 1231 is formed at the upper end of the 2_1 flow channel 1221 by extending toward the trailing edge 1004. The 2_1 forward channel 1231 allows the second cooling fluid flowing through the 2_1 flow channel

1221 to flow to the 2_2 flow channel 1241. The 2_2 flow channel 1241 allows the second cooling fluid to flow downward toward the root 110.

The 2_3 flow channel 1222 communicates with the 2_2 inlet 1212, and the second cooling fluid introduced into the 2_2 inlet 1212 flows upward toward the airfoil tip 1006.

The 2_2 forward channel 1232 is formed at the upper end of the 2_3 flow channel 1222 by extending toward the leading edge 1003. The 2_2 forward channel 1232 allows the second cooling fluid flowing through the 2_3 flow channel 1222 to flow to the 2_4 flow channel 1242. The 2_4 flow channel 1242 allows the second cooling fluid to flow downward toward the root 110.

Figure 10:
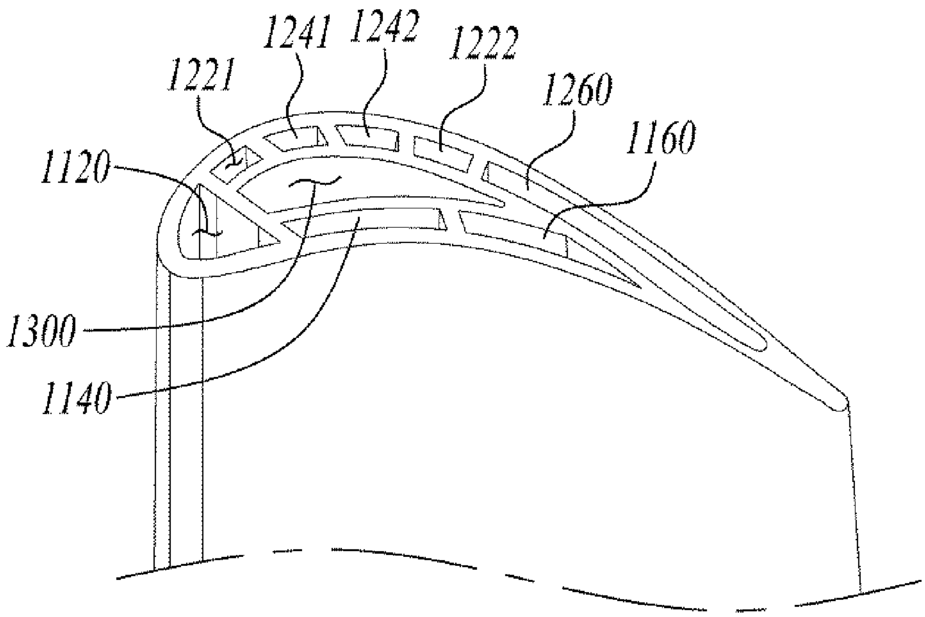
FIG. 10 is a cross-sectional view taken along line A-A of FIG. 3 when viewed from top.

The 2_2 flow channel 1241 and the 2_4 flow channel 1242 have communication ports 1251 and 1252, respectively, formed on the respective lower sides thereof to communicate with a central cavity 1300 (see FIG. 10). The communication ports 1251 and 1252 are formed on the side of the central cavity 1300. Of course, the communication ports 1251 and 1252 do not necessarily need to be formed on the side of the central cavity.

The central cavity 1300 is a flow space defined among and surrounded by a leading edge cavity 1120, pressure side cavities formed by the 1_2 flow channel 1140 and the 1_3 flow channel 1160, and the suction side cavities formed by the 2_1 flow channel 1221, the 2_2 flow channel 1241, the 2_4 flow channel 1242 and the 2_3 flow channel 1222. The second cooling fluids flowing through the 2_2 flow channel 1241 and the 2_4 flow channel 1242 are introduced into and joined in the central cavity 1300 through the communication ports 1251 and 1252.

The second discharge channel 1260 extends at substantially the same height as the central cavity 1300, and communicates with the central cavity 1300 through one or more connection port 1301 (see FIG. 5) formed on a trailing edge side of the central cavity 1300. The second discharge channel 1260 may have a plurality of discharge holes 1261 formed in a matrix form in a predetermined trailing edge region thereof to discharge the second cooling fluid.

According to an embodiment, the central cavity 1300 may be configured with a shorter height such that it is disposed radially below (i.e., radially inward than) the 1_1 forward channel 1130 and 1_3 forward channel 1170 while the 1_1 flow channel 1120, the 1_2 flow channel 1140, the 1_3 flow channel 1160 of the first cooling passage 1100 and the 2_1 flow channel 1221, a 2_2 flow channel 1241, the 2_3 flow channel 1222, the 2_4 flow channel 1242 are substantially in a same height. According to an embodiment, the first discharge channel 1180 may be disposed such that its radial location is more outward than the central cavity 1300 and the second discharge channel 1260.

Also, when a direction between the front surface (pressure side) and the rear surface (suction side) is defined as a width direction, the width of the 1_1 forward channel 1130 and the 1_3 forward channel 1170 in the width direction may be larger than the width of the 1_1 flow channel 1120, the 1_2 flow channel 1140, and the 1_3 flow channel 1160 such that the cavities formed by the 1_1 forward channel 1130 and the 1_3 forward channel 1170 are disposed radially above the central cavity 1300 and the second discharge channel 1260, respectively.

The 2_1 flow channel 1221, the 2_2 flow channel 1241, the 2_3 flow channel 1222, and the 2_4 flow channel 1242 may form at least two serpentine channels on the suction side 1002. These continuous at least two serpentine channels design elongate and increase the flow path and the flow time of the second cooling fluid, thereby improving cooling efficiency. In particular, the second cooling fluid flowing through the second cooling passage 1200 can effectively cool the trailing edge 1004, the suction side 1002, and the airfoil tip on the suction side 1002.

Figure 11:
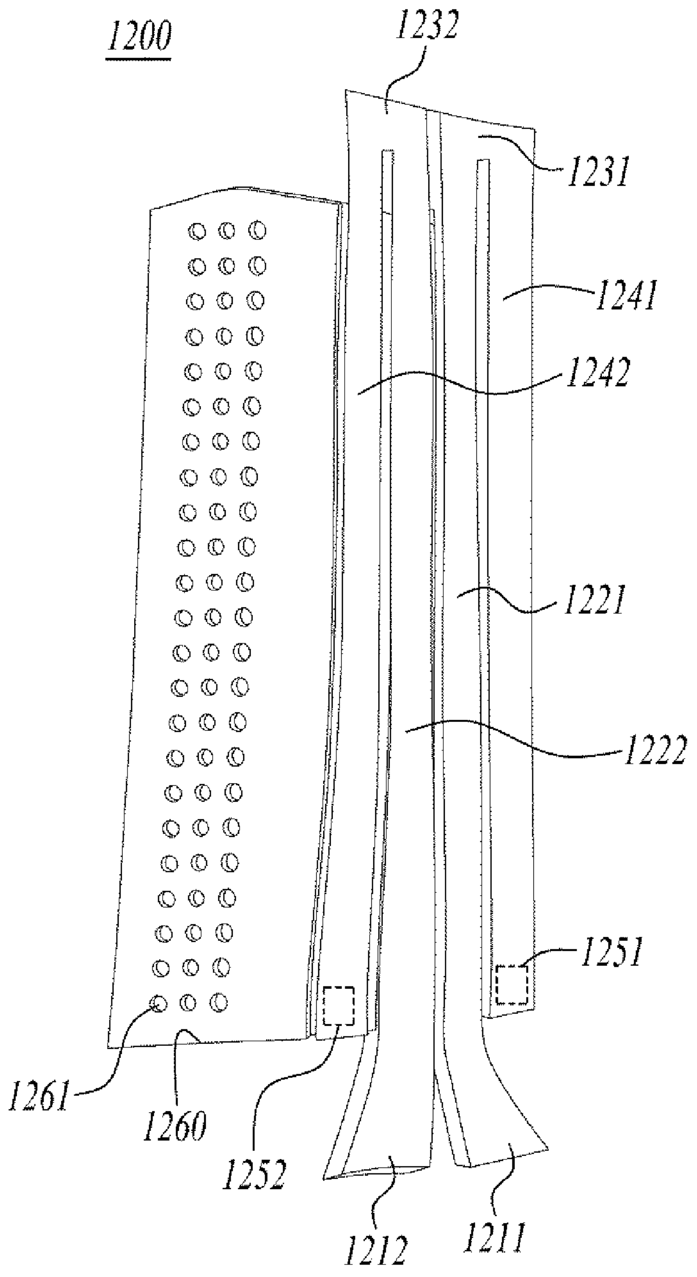
FIG. 11 is a perspective view illustrating a second cooling passage formed within an airfoil according to another exemplary embodiment.

Hereinafter, an airfoil according to another exemplary embodiment will be described with reference to FIG. 11. FIG. 11 is a perspective view illustrating a second cooling passage formed within an airfoil according to another exemplary embodiment.

The airfoil according to another exemplary embodiment includes a first cooling passage 1100 and a second cooling passage 1200. Since the airfoil according to another exemplary embodiment has the same configuration as that of the above embodiment, with the sole exception of a partially different configuration of the second cooling passage 1200, a redundant description thereof will be omitted. For convenience of explanation, the same reference numerals are assigned to the same components.

Referring to FIG. 11, unlike the above embodiment, the second cooling channel 1200 according to this embodiment includes a 2_1 inlet 1211 and a 2_2 inlet 1212 that are disposed close to each other. Accordingly, a 2_1 flow channel 1221 and a 2_3 flow channel 1222 are disposed close to each other, a 2_1 forward channel 1231 extends toward the leading edge 1003 from the upper end of the 2_1 flow channel 1221, and a 2_2 forward channel 1232 extends toward the trailing edge 1004 from the upper end of the 2_3 flow channel 1222.

In the embodiments of the present disclosure, the cooling fluid introduced into the root inlet 111 formed in the root 110 is divided and flows into the first inlet 1110, the 2_1 inlet 1211, and the 2_2 inlet 1212. In the formerly described embodiment, since the 2_1 inlet 1211 and the 2_2 inlet 1212 are disposed relatively far apart and the first inlet 1110 and the 2_1 inlet 1211 are adjacent to each other, a larger amount of cooling fluid may be introduced toward the first inlet 1110.

On the other hand, in this latter embodiment, since the 2_1 inlet 1211 and the 2_2 inlet 1212 are disposed close to each other, it is possible to partially prevent the second cooling fluid expected to be introduced into the second inlets 1211 and 1212 from flowing into the first inlet 1110.

As is apparent from the above description, the airfoil, and the turbine blade and gas turbine including the same according to the exemplary embodiments can improve cooling efficiency as the airfoil includes the first cooling passage for cooling the leading edge and the pressure side and the second cooling passage for cooling the trailing edge and the suction side.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims. Also, it is noted that any one feature of an embodiment of the present disclosure described in the specification may be applied to another embodiment of the present disclosure.

What is claimed is:

1. An airfoil comprising:

a suction side forming a curved surface convexly protruding outward;

a pressure side forming a curved surface concavely recessed toward the suction side;

a leading edge connecting the suction side and the pressure side and formed at a front end of the airfoil;

a trailing edge connecting the suction side and the pressure side and formed at a rear end of the airfoil;

a first cooling passage allowing a first cooling fluid introduced from the bottom of the leading edge to flow into a first serpentine channel formed on the pressure side, and to be then discharged to the rear of the trailing edge; and a second cooling passage allowing a second cooling fluid introduced from the bottom of the suction side to be divided and flow into at least two second serpentine channels formed on the suction side, and allowing the divided cooling fluids introduced into the at least two second serpentine channels to be joined at the bottom thereof and to be then discharged to the rear of the trailing edge.

2. The airfoil according to claim 1, wherein the first cooling passage comprises:

a first inlet extending downward from the bottom of the leading edge and through which the first cooling fluid flows;

a 1_1 flow channel allowing the first cooling fluid introduced into the first inlet to flow toward an airfoil tip;

a 1_2 flow channel formed adjacent to the 1_1 flow channel and allowing the first cooling fluid to flow toward a root;

a 1_3 flow channel formed adjacent to the 1_2 flow channel and allowing the first cooling fluid to flow toward the airfoil tip;

a 1_1 forward channel extending toward the trailing edge from an upper end of the 1_1 flow channel to 1_2 flow channel; and a 1_2 forward channel extending toward the trailing edge from a lower end of the 1_2 flow channel to the 1_3 flow channel.

3. The airfoil according to claim 2, wherein the first cooling passage further comprises:

a 1_3 forward channel extending toward the trailing edge from an upper end of the 1_3 flow channel; and a first discharge channel through which the first cooling fluid flowing through the 1_3 flow channel is discharged to the outside, and wherein, when the height from the base of the first cooling passage to the top of the first cooling passage is set to 100, the first discharge channel is formed in a height range of 70 to less than 100.

4. The airfoil according to claim 1, wherein the second cooling fluid is divided before being introduced into the second cooling passage;

wherein the second cooling passage comprises:

a 2_1 inlet and a 2_2 inlet extending downward from the suction side and into which the divided second cooling fluid flows;

a 2_1 flow channel and a 2_3 flow channel allowing the second cooling fluid introduced into the 2_1 inlet and the 2_2 inlet to flow toward an airfoil tip, respectively; and a 2_2 flow channel and a 2_4 flow channel formed adjacent to the 2_1 flow channel and the 2_3 flow channel and allowing the second cooling fluid to flow toward a root.

5. The airfoil according to claim 4, wherein the second cooling passage further comprises:

a 2_1 forward channel extending toward the trailing edge from an upper end of the 2_1 flow channel to the 2_2 flow channel; and a 2_2 forward channel extending toward the leading edge from an upper end of the 2_3 flow channel to the 2_4 flow channel.

6. The airfoil according to claim 5, wherein:

the 2_2 flow channel and the 2_4 flow channel have communication ports formed on respective lower ends thereof, the communication ports communicating with a central cavity formed among and surrounded by a leading edge cavity, a pressure side cavity, and a suction side cavity; and the second cooling fluids flowing through the 2_2 flow channel and the 2_4 flow channel are joined in the central cavity through the communication ports.

7. The airfoil according to claim 4, wherein the 2_1 inlet and the 2_2 inlet are close to each other, and wherein the second cooling passage further comprises:

a 2_1 forward channel extending toward the leading edge from an upper end of the 2_1 flow channel to the 2_2 flow channel; and a 2_2 forward channel extending toward the trailing edge from an upper end of the 2_3 flow channel to the 2_4 flow channel.

8. A turbine blade mounted on a turbine rotor disk and rotated by high-pressure combustion gas, the turbine blade comprising:

a root formed a lower side thereof and coupled to the turbine rotor disk, and an airfoil integrally formed on the root, the airfoil being rotated by the high-pressure combustion gas, wherein the airfoil comprises:

a suction side forming a curved surface convexly protruding outward;

a pressure side forming a curved surface concavely recessed toward the suction side;

a leading edge connecting the suction side and the pressure side and formed at a front end of the airfoil;

a trailing edge connecting the suction side and the pressure side and formed at a rear end of the airfoil;

a first cooling passage allowing a first cooling fluid introduced from the bottom of the leading edge to flow into a first serpentine channel formed on the pressure side, and to be then discharged to the rear of the trailing edge; and a second cooling passage allowing a second cooling fluid introduced from the bottom of the suction side to be divided and flow into at least two second serpentine channels formed on the suction side, and allowing the divided cooling fluids introduced into the at least two second serpentine channels to be joined at the bottom thereof and to be then discharged to the rear of the trailing edge.

9. The turbine blade according to claim 8, wherein the first cooling passage comprises:

a first inlet extending downward from the bottom of the leading edge and through which the first cooling fluid flows;

a 1_1 flow channel allowing the first cooling fluid introduced into the first inlet to flow toward an airfoil tip;

a 1_2 flow channel formed adjacent to the 1_1 flow channel and allowing the first cooling fluid to flow toward the root;

a 1_3 flow channel formed adjacent to the 1_2 flow channel and allowing the first cooling fluid to flow toward the airfoil tip;

a 1_1 forward channel extending toward the trailing edge from an upper end of the 1_1 flow channel to 1_2 flow channel; and a 1_2 forward channel extending toward the trailing edge from a lower end of the 1_2 flow channel to 1_3 flow channel.

10. The turbine blade according to claim 9, wherein the first cooling passage further comprises:

a 1_3 forward channel extending toward the trailing edge from an upper end of the 1_3 flow channel; and a first discharge channel through which the first cooling fluid flowing through the 1_3 flow channel is discharged to the outside, and wherein, when the height from the base of the first cooling passage to the top of the first cooling passage is set to 100, the first discharge channel is formed in a height range of 70 to less than 100.

11. The turbine blade according to claim 8, wherein the second cooling fluid is divided before being introduced into the second cooling passage;

wherein the second cooling passage comprises:

a 2_1 inlet and a 2_2 inlet extending downward from the suction side and into which the divided second cooling fluid flows;

a 2_1 flow channel and a 2_3 flow channel allowing the second cooling fluid introduced into the 2_1 inlet and the 2_2 inlet to flow toward an airfoil tip, respectively; and a 2_2 flow channel and a 2_4 flow channel formed adjacent to the 2_1 flow channel and the 2_3 flow channel and allowing the second cooling fluid to flow toward the root.

12. The turbine blade according to claim 11, wherein the second cooling passage further comprises:

a 2_1 forward channel extending toward the trailing edge from an upper end of the 2_1 flow channel to the 2_2 flow channel; and a 2_2 forward channel extending toward the leading edge from an upper end of the 2_3 flow channel to the 2_4 flow channel.

13. The turbine blade according to claim 12, wherein:

the 2_2 flow channel and the 2_4 flow channel have communication ports formed on respective lower ends thereof, the communication ports communicating with a central cavity formed among and surrounded by a leading edge cavity, a pressure side cavity, and a suction side cavity; and the second cooling fluids flowing through the 2_2 flow channel and the 2_4 flow channel are joined in the central cavity through the communication ports.

14. The turbine blade according to claim 11, wherein the 2_1 inlet and the 2_2 inlet are close to each other, and wherein the second cooling passage further comprises:

a 2_1 forward channel extending toward the leading edge from an upper end of the 2_1 flow channel to the 2_2 flow channel; and a 2_2 forward channel extending toward the trailing edge from an upper end of the 2_3 flow channel to the 2_4 flow channel.

15. A gas turbine comprising:

a compressor configured to compress air introduced thereinto, a combustor configured to mix the air compressed by the compressor with fuel for combustion, and a turbine configured to generate power with combustion gas from the combustor and comprising a turbine vane for guiding the combustion gas on a combustion gas path through the combustion gas passes, and a turbine blade rotated by the combustion gas on the combustion gas path, wherein the turbine blade comprises an airfoil with a cooling passage formed therein, and wherein the airfoil comprises:

a suction side forming a curved surface convexly protruding outward;

a pressure side forming a curved surface concavely recessed toward the suction side;

a leading edge connecting the suction side and the pressure side and formed at a front end of the airfoil;

a trailing edge connecting the suction side and the pressure side and formed at a rear end of the airfoil;

a first cooling passage allowing a first cooling fluid introduced from the bottom of the leading edge to flow into a first serpentine channel formed on the pressure side, and to be then discharged to the rear of the trailing edge; and a second cooling passage allowing a second cooling fluid introduced from the bottom of the suction side to be divided and flow into at least two second serpentine channels formed on the suction side, and allowing the divided cooling fluids introduced into the at least two second serpentine channels to be joined at the bottom thereof and to be then discharged to the rear of the trailing edge.

16. The gas turbine according to claim 15, wherein the first cooling passage comprises:

a first inlet extending downward from the bottom of the leading edge and through which the first cooling fluid flows;

a 1_1 flow channel allowing the first cooling fluid introduced into the first inlet to flow toward an airfoil tip;

a 1_2 flow channel formed adjacent to the 1_1 flow channel and allowing the first cooling fluid to flow toward a root;

a 1_3 flow channel formed adjacent to the 1_2 flow channel and allowing the first cooling fluid to flow toward the airfoil tip;

a 1_1 forward channel extending toward the trailing edge from an upper end of the 1_1 flow channel to the 1_2 flow channel; and a 1_2 forward channel extending toward the trailing edge from a lower end of the 1_2 flow channel to the 1_3 flow channel.

17. The gas turbine according to claim 16, wherein the first cooling passage further comprises:

a 1_3 forward channel extending toward the trailing edge from an upper end of the 1_3 flow channel; and a first discharge channel through which the first cooling fluid flowing through the 1_3 flow channel is discharged to the outside, and wherein, when the height from the base of the first cooling passage to the top of the first cooling passage is set to 100, the first discharge channel is formed in a height range of 70 to less than 100.

18. The gas turbine according to claim 15, wherein the second cooling fluid is divided before being introduced into the second cooling passage;

wherein the second cooling passage comprises:

a 2_1 inlet and a 2_2 inlet extending downward from the suction side and into which the divided second cooling fluid flows;

a 2_1 flow channel and a 2_3 flow channel allowing the second cooling fluid introduced into the 2_1 inlet and the 2_2 inlet to flow toward an airfoil tip, respectively; and a 2_2 flow channel and a 2_4 flow channel formed adjacent to the 2_1 flow channel and the 2_3 flow channel and allowing the second cooling fluid to flow toward a root.

19. The gas turbine according to claim 18, wherein the second cooling passage further comprises:

a 2_1 forward channel extending toward the trailing edge from an upper end of the 2_1 flow channel to the 2_2 flow channel; and a 2_2 forward channel extending toward the leading edge from an upper end of the 2_3 flow channel to the 2_4 flow channel, wherein the 2_2 flow channel and the 2_4 flow channel have communication ports formed on respective lower ends thereof, the communication ports communicating with a central cavity formed among and surrounded by a leading edge cavity, a pressure side cavity, and a suction side cavity, and wherein the second cooling fluids flowing through the 2_2 flow channel and the 2_4 flow channel are joined in the central cavity through the communication ports.

20. The gas turbine according to claim 18, wherein the 2_1 inlet and the 2_2 inlet are close to each other, and wherein the second cooling passage further comprises:

a 2_1 forward channel extending toward the leading edge from an upper end of the 2_1 flow channel to the 2_2 flow channel; and a 2_2 forward channel extending toward the trailing edge from an upper end of the 2_3 flow channel to the 2_4 flow channel.

* * * * *